United States Patent
Winter

(10) Patent No.: US 10,006,104 B2
(45) Date of Patent: Jun. 26, 2018

(54) PRODUCTION OF LOW CARBON CHROMIUM IRON ALLOYS FROM CHROMITE CONCENTRATES

(71) Applicants: METHAVRIO LLC, Jeannette, PA (US); KWG RESOURCES, INC, Toronto (CA)

(72) Inventor: Frank Winter, Jeannette, PA (US)

(73) Assignee: KWG RESOURCES, INC., Toronto, ON (CA)

( * ) Notice: Subject to any disclaimer, the term of this patent is extended or adjusted under 35 U.S.C. 154(b) by 278 days.

(21) Appl. No.: 15/030,100

(22) PCT Filed: Oct. 21, 2014

(86) PCT No.: PCT/US2014/061458
§ 371 (c)(1),
(2) Date: Apr. 18, 2016

(87) PCT Pub. No.: WO2015/061249
PCT Pub. Date: Apr. 30, 2015

(65) Prior Publication Data
US 2016/0237526 A1   Aug. 18, 2016

Related U.S. Application Data

(60) Provisional application No. 61/893,407, filed on Oct. 21, 2013.

(51) Int. Cl.
| | |
|---|---|
| C22C 33/00 | (2006.01) |
| C22C 33/04 | (2006.01) |
| C22C 1/06 | (2006.01) |
| C21C 7/076 | (2006.01) |
| C22C 38/06 | (2006.01) |
| C22C 38/18 | (2006.01) |

(52) U.S. Cl.
CPC ............... C22C 1/06 (2013.01); C21C 7/076 (2013.01); C22C 38/06 (2013.01); C22C 38/18 (2013.01); *Y02P 10/242* (2015.11)

(58) Field of Classification Search
CPC .......... C21C 7/00; C21C 5/5264; C21C 5/54; C21C 7/076; C22B 34/32; C22C 33/04; C22C 38/004; C22C 38/06
USPC ............................................ 420/71, 428, 15
See application file for complete search history.

(56) References Cited

U.S. PATENT DOCUMENTS

| | | | | | |
|---|---|---|---|---|---|
| 2,021,979 | A | * | 11/1935 | Arness | C22C 33/04 420/65 |
| 2,098,176 | A | * | 11/1937 | Udy | C21B 5/00 423/155 |
| 3,158,464 | A | * | 11/1964 | Chynoweth | C21B 34/32 420/428 |
| 3,198,624 | A | * | 8/1965 | Bell | C21C 5/005 420/15 |
| 3,252,790 | A | * | 5/1966 | Krivsky | C21C 7/0685 420/71 |
| 3,300,302 | A | * | 1/1967 | Bleloch | C21C 5/005 420/129 |
| 3,301,669 | A | * | 1/1967 | Rathmann | C21C 7/00 420/428 |
| 4,737,204 | A | * | 4/1988 | Anton | C21D 6/002 148/325 |
| 5,395,420 | A | * | 3/1995 | Masucci | C21C 5/5264 420/116 |
| 8,277,537 | B2 | * | 10/2012 | Park | C21C 7/0075 75/512 |

* cited by examiner

*Primary Examiner* — Erin B Saad
(74) *Attorney, Agent, or Firm* — Carothers & Carothers

(57) ABSTRACT

A process for producing low carbon chromium iron alloys directly from chromite concentrates wherein superheated liquid aluminum is flowed in a controlled manner into a reaction vessel preheated to a temperature of approximately 1,000° C. while simultaneously feeding chromite concentrates preheated to a temperature in the same range at a controlled rate into the preheated reaction vessel. The ratio of chromite to aluminum is controlled to be at or above the stoichiometric ratio required to reduce the oxide from chromium and iron to low carbon ferrochrome alloy. Burnt lime is continuously added to the vessel in an amount sufficient to form and flux a slag of the eutectic composition known as calcium aluminate.

12 Claims, No Drawings

PRODUCTION OF LOW CARBON
CHROMIUM IRON ALLOYS FROM
CHROMITE CONCENTRATES

CROSS REFERENCE

This application claims the benefit of U.S. Provisional Patent Application No. 61/893,407, filed on 21 Oct. 2013, for PRODUCTION OF CHROMIUM IRON ALLOYS DIRECTLY FROM CHROMITE CONCENTRATES, the entire contents of which are incorporated herein by reference.

BACKGROUND OF THE INVENTION

The production of superalloys, stainless and low alloy steels containing chromium has undergone a period of rapid expansion, particularly in Asia. The use of chromium in these alloys is not open to substitution by other metals. Properties such as resistance to corrosion and oxidation at high temperatures are only realized due to the presence of chromium in the alloy. Whenever possible, chromium containing scraps are recycled into new material by remelting, but there is a substantial shortfall in the availability of scrap, particularly in developing countries. The need for chromium in superalloy, stainless steel and low alloy steel production is met by the use of a family of alloys known as ferrochrome. These alloys are produced commercially on a large scale in a range of compositions. Of particular concern to steel making consumers is the carbon content of the alloy, with some applications demanding the use of chromium additions containing very low carbon contents, typically less than 0.030%. The existing process for the production of these alloys is complicated and therefore expensive when compared to the higher carbon materials.

There are currently no known commercially viable chrome ore sources in the USA and no domestic production of these low carbon ferrochrome alloys at this time. All ferrochrome usage is supplied via import from overseas, typically from South Africa and Kazakhstan.

Low carbon ferrochrome is currently produced using very energy intensive processes. These typically involve the use of Submerged Electric Arc Furnaces (SAF's), which require very large quantities of electricity, generate fume offgasses, slags and other waste streams requiring stringent environmental controls and the equipment to achieve them. The SAF units product a high carbon alloy which has to be further refined in order to reduce the carbon content to acceptable levels.

SUMMARY OF THE INVENTION

The present invention provides a process for producing low carbon chromium iron alloys from chromite concentrates wherein superheated liquid aluminum is flowed in a controlled manner into a reaction vessel preheated to a temperature range of approximately 800° C. to 1,150° C. (typically approximately 1,000° C.) while simultaneously feeding chromite concentrates preheated to a temperature in the range of approximately 800° C. to 1,150° C. (typically approximately 1,000° C.) at a controlled rate into the preheated reaction vessel. The ratio of chromite to aluminum is closely controlled to be at or above the stoichiometric ratio required to reduce the oxides of chromium and iron to low carbon ferrochrome alloy. Burnt lime is continuously added to the vessel in an amount sufficient to form and flux slag in the reaction vessel, thereby reacting the liquid aluminum with the preheated chromite concentrates to form liquid low carbon chromium iron alloy beneath the slag. The liquid low carbon chromium iron alloy is periodically removed from beneath the slag in the vessel.

In order to instead produce high purity chromium metal, the chromite concentrates in the process of the present invention may be replaced by nearly pure or pure chrome oxide powder and the process will thereby produce high purity chromium metal and calcium aluminate.

Other objects and advantages of the present invention appear hereinafter in the following description and claims.

DESCRIPTION OF THE PROCESS OF THE PRESENT INVENTION

The process of the present invention uses suitable chromite ore concentrates preferably produced in the "Ring of Fire" location in Northern Ontario, Canada. This chromite is primarily composed of oxides of chromium and iron, together with some residual gangue compounds such as alumina, magnesia and silica. The chromite concentrates are preferably in the form of fines less than approximately 100 mesh in size and are inherently low in carbon, phosphorus and sulphur. The conversion of the concentrates to low carbon chrome iron alloys can be accomplished in a single step as described hereinafter. A reaction vessel in the form of a refractory vessel is used with a suitable refractory lining, typically magnesia, plus a refractory cover and offgas extraction equipment. This empty vessel is preheated using natural gas to a temperature in the range of approximately 800° C. to 1,150° C., typically approximately 1000° C. An induction furnace is seen as such a suitable vessel, as is also a steel mill ladle with a tilting device.

Aluminum, such as in the form of aluminum scrap, is melted, preferably in a separate gas fired furnace and superheated to a temperature well above its melting point of approximately 660° C., typically in excess of 1,000° C. The liquid aluminum is then allowed to flow in a controlled manner into the preheated reaction vessel. Simultaneously chromite concentrates, also preheated in a gas fired furnace to around the same temperature, are fed into the reaction vessel at a controlled rate. The ratio of chromite and liquid aluminum is controlled by a process computer to provide a blend at or slightly above, up to approximately 115% of the stoichiometric ratio required to reduce the oxides of chromium and iron directly to a low carbon ferrochrome alloy. These highly exothermic reactions also produce an immiscible slag, composed primarily of alumina and gangue materials. The composition of this slag is such that it is viscous and has a very high melting point. A controlled addition of preheated burnt lime is made with the intent of forming a slag with the eutectic composition of calcium aluminate at approximately 50% alumina and approximately 50% lime.

Experimental work has determined that a small addition, around 3% to 5%, of an alkali salt, typically sodium hydroxide, also readily reduces the melting point and the viscosity of the slag and facilitates the separation of the metallic alloy and the slag. The calcium aluminate slag produced is readily marketed as an additive to steelmaking ladle furnaces. This process therefore results in little or no residual waste streams and is environmentally friendly.

This novel process can be accomplished in a single stage using inexpensive low tech equipment within a very small building footprint, uses almost no electricity as compared to conventional processes and focuses on the use of relatively inexpensive and presently plentiful natural gas as the energy source for melting and preheating the process components. The process has no need for any form of carbonaceous reductant and does not require aluminum as a fine powder which is difficult to produce, transport and store.

Pure or nearly pure chromium oxide can also be readily produced from "Ring of Fire" (ROF) chromite concentrates using established chemical processes. This iron and gangue free chromium oxide can be used in the process previously outlined in order to produce almost pure chromium metal which has a melting point at or around 1,860° C. This is a highly desirable and strategically important material in demanding applications, such as aerospace alloys, hard metals, plating and thermal spray powders. The chromite concentrates can be replaced by pure or almost pure chrome oxide powder to produce high purity chromium metal and calcium aluminate.

I claim:

1. A process for producing low carbon chromium iron alloys from chromite concentrates, comprising;
   flowing superheated liquid aluminum in a controlled manner into a reaction vessel preheated to a temperature in the range of approximately 800° C. to 1150° C. while simultaneously feeding chromite concentrates preheated to a temperature in the range of approximately 800° C. to 1150° C. at a controlled rate into said preheated reaction vessel, a ratio of chromite to aluminum being controlled to be at or above the stoichiometric ratio required to reduce the oxides of chromium and iron to low carbon ferrochrome alloy;
   continuously adding burnt lime to said vessel in an amount to form and flux slag in said reaction vessel, and thereby reacting the liquid aluminum with the preheated chromite concentrates to form liquid low carbon chromium iron alloy beneath said slag; and
   periodically removing liquid low carbon chromium iron alloy from beneath said slag in said vessel.

2. The process of claim 1, wherein said chromite concentrates are fines of less than 100 mesh.

3. The process of claim 1, wherein said liquid aluminum is superheated above its melting point of 660° C. to a temperature in excess of approximately 1000° C.

4. The process of claim 1, wherein said reaction vessel is an induction furnace of large capacity.

5. The process of claim 1, wherein said ratio is controlled up to approximately 115% of the stoichiometric ratio value.

6. The process of claim 1, wherein said ratio of chromite to aluminum is controlled by a process computer.

7. The process of claim 1, wherein the chromite concentrates are from the ROF.

8. The process of claim 1, wherein said burnt lime is preheated and is composed to form a slag with the eutectic composition of calcium aluminate at approximately 50% alumina and approximately 50% lime.

9. The process of claim 1, including decanting and cooling said slag for use as calcium aluminate in ladle furnace processing of steel.

10. The process of claim 1, including the addition of an alkali salt to said vessel in the approximate range of 3% to 5% by weight.

11. The process of claim 10, wherein said alkali salt is selected as sodium hydroxide.

12. The process of claim 1, wherein the chromite concentrates in the process are chrome oxide powder.

* * * * *